(12) United States Patent
Tanaka

(10) Patent No.: US 8,203,241 B2
(45) Date of Patent: Jun. 19, 2012

(54) ELECTRIC MOTOR

(75) Inventor: Daiki Tanaka, Zamai (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 113 days.

(21) Appl. No.: 12/920,563

(22) PCT Filed: Mar. 2, 2009

(86) PCT No.: PCT/JP2009/053894
§ 371 (c)(1),
(2), (4) Date: Sep. 1, 2010

(87) PCT Pub. No.: WO2009/110437
PCT Pub. Date: Sep. 11, 2009

(65) Prior Publication Data
US 2011/0012448 A1 Jan. 20, 2011

(30) Foreign Application Priority Data

Mar. 3, 2008 (JP) .................................. 2008-052614

(51) Int. Cl.
*H02K 9/00* (2006.01)
(52) U.S. Cl. .......................................... 310/54; 310/64
(58) Field of Classification Search .................... 310/52, 310/54, 58, 64
See application file for complete search history.

(56) References Cited

U.S. PATENT DOCUMENTS 6,489,697 B1 * 12/2002 Ozawa et al. ................... 310/54
2007/0278869 A1 * 12/2007 Taketsuna ........................ 310/54

FOREIGN PATENT DOCUMENTS

| JP | 10-243617 A | 9/1998 |
| JP | 2001-37129 A | 2/2001 |
| JP | 2006-248417 A | 9/2006 |
| JP | 2007-174755 A | 7/2007 |

* cited by examiner

*Primary Examiner* — Nguyen N Hanh
(74) *Attorney, Agent, or Firm* — Foley & Lardner LLP

(57) ABSTRACT

An electric motor (10) of the present invention includes: a stator (11); a rotor (12) axially supported to a rotational shaft (13) in such a configuration as to rotate relative to the stator (11), the rotor (12) being adapted to be cooled by a cooling medium (L); a cooling medium storing portion (60) disposed on the stator (11) side and storing therein (60) the cooling medium (L); and a cooling medium channel (22) for leading the cooling medium (L) from the cooling medium storing portion (60) to the rotor (12), wherein a discharge port (23*a*) for discharging the cooling medium (L) of the cooling medium channel (22) is disposed close to a rotational portion (18*a*) of the rotor (12), the cooling medium storing portion (60) is disposed lower than the discharge port (23*a*), and a negative pressure caused between the rotor (12) and the discharge port (23*a*) sucks the cooling medium (L) in the cooling medium storing portion (60).

13 Claims, 13 Drawing Sheets

ELECTRIC MOTOR

TECHNICAL FIELD

The present invention relates to an electric motor. More specifically, the present invention relates to the electric motor provided with a cooling mechanism for cooling a rotor in rotation.

BACKGROUND ART

Conventionally, in a rotor of a permanent magnet electric motor, an iron loss (swirl loss and hysteresis loss) is known to be a main loss. When the speed of the rotor is increased, a passing magnetic flux is also increased, thus increasing the iron loss. As a result, the rotor causes a heat. With the rotor so heated as to cause a high temperature, magnetic characteristics of the magnet or magnetic body will be deteriorated. Therefore, cooling of the rotor is needed.

For cooling the above rotor, for example, an "electric rotor" (refer to Patent Literature 1) having a scratching lubricating cooling mechanism where a surface of the rotor contacts a cooling medium and stirring of the cooling medium cools the rotor and stator is provided. Moreover, a method of providing an external oil pump for sending the cooling medium by means of an external pump or other method is provided.

[Patent Literature 1] Japanese Patent Application Laid-Open No. 2001-37129

DISCLOSURE OF INVENTION

However, in the case of the scratching lubrication of the conventional "electric rotor," viscosity resistance of the cooling medium intervening between the stator and the rotor is large in a region where the rotor does not need cooling in a low speed rotation. Though the magnetic resistance during a high speed rotation of the rotor is improved, a rotational resistance during the low speed rotation deteriorates cooling efficiency as an electric motor, which was not avoided.

In addition, with respect to the electric rotor including the external oil pump, it is possible to efficiently cool the rotor only during the high speed rotation. However, this method was high in cost.

The present invention has been made in view of the above problems. It is an object of the present invention to provide an electric motor capable of cooling a rotor by a cooling medium without the need of providing an external pump. It is another object of the present invention to provide the electric motor which can prevent the rotor's cooling efficiency from being deteriorated, which deterioration may be caused when the viscosity resistance of the cooling medium is increased during a low speed rotation of the rotor.

According to the present invention, there is provided an electric motor, comprising: a stator; a rotor axially supported to a rotational shaft in such a configuration as to rotate relative to the stator, the rotor being adapted to be cooled by a cooling medium; a cooling medium storing portion disposed on the stator side and storing therein the cooling medium; and a cooling medium channel for leading the cooling medium from the cooling medium storing portion to the rotor, wherein a discharge port for discharging the cooling medium of the cooling medium channel is disposed close to a rotational portion of the rotor, the cooling medium storing portion is disposed lower than the discharge port, and a negative pressure caused between the rotor and the discharge port sucks the cooling medium in the cooling medium storing portion.

Moreover, according to the present invention, there is provided an axial gap electric motor, comprising: a stator; a rotor axially supported to a rotational shaft in such a configuration as to rotate relative to the stator, the rotor being adapted to be cooled by a cooling medium; a cooling medium storing portion disposed on the stator side and storing therein the cooling medium; a cooling medium channel for leading the cooling medium from the cooling medium storing portion to the rotor; and a variable air gap mechanism for varying an air gap between the rotor and the stator by moving the rotor in such a configuration that the rotor approaches the stator and moves away from the stator, wherein a discharge port for discharging the cooling medium of the cooling medium channel is disposed close to a rotational portion of the rotor in such a configuration as to face a face opposite to the air gap between the rotor and the stator, the cooling medium storing portion is disposed lower than the discharge port, and a negative pressure caused between the rotor and the discharge port sucks the cooling medium in the cooling medium storing portion.

BRIEF DESCRIPTION OF DRAWINGS

FIG. 5 shows a tip end portion of a nozzle according to the second embodiment of the present invention, where FIG. 5A is an explanatory view of a cross section of a curved structure while

FIG. 10 shows an enlarged view of the tip end portion of the nozzle, where FIG. 10A is a plan explanatory view of the nozzle while

BEST MODE FOR CARRYING OUT THE INVENTION

Figure 1:
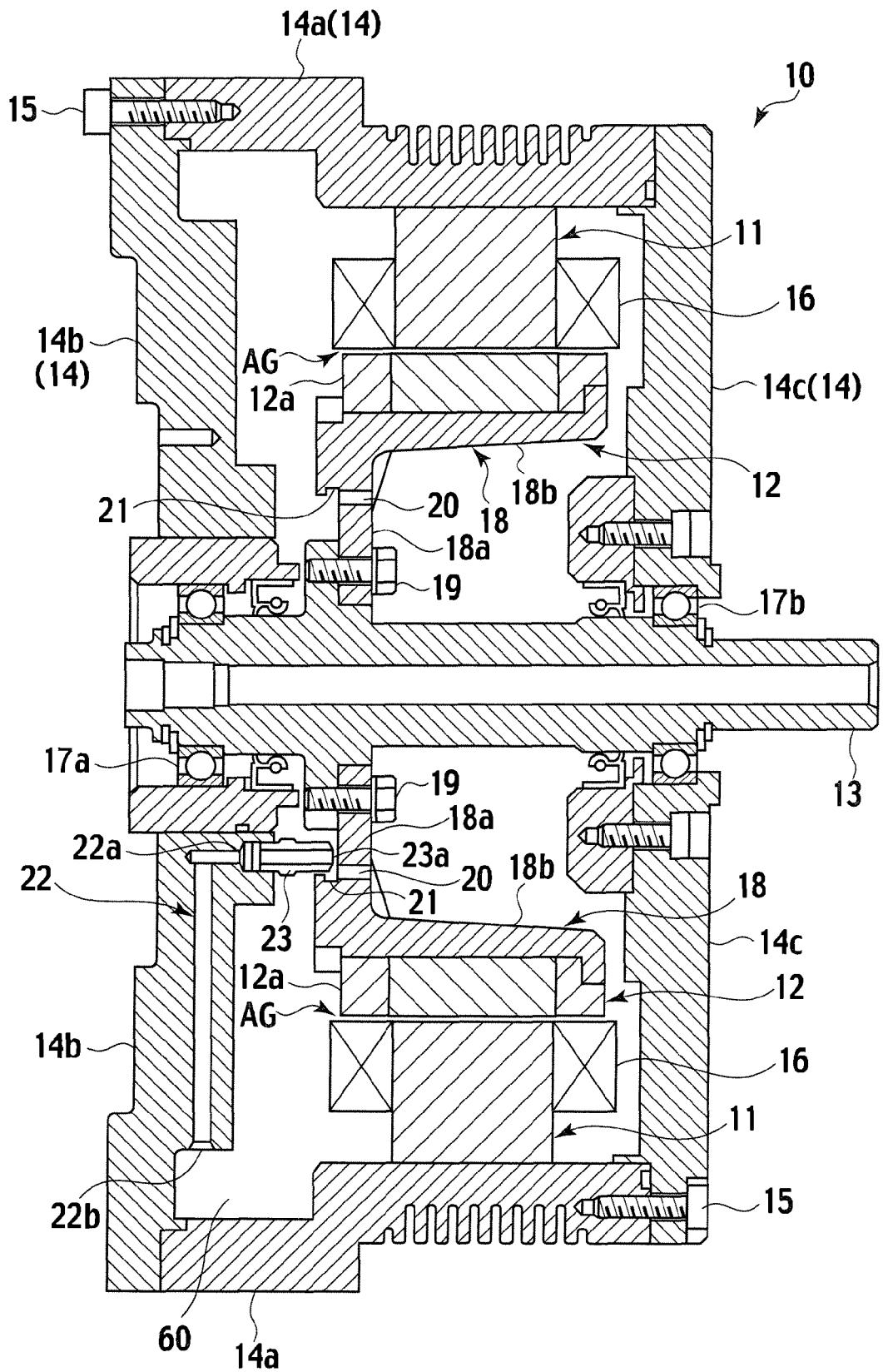
FIG. 1 is a cross sectional view showing a motor, according to the first embodiment of the present invention.

Hereinafter, the best mode for carrying out the invention is to be set forth, referring to the drawings.

(First Embodiment)

FIG. 1 is a cross sectional view showing a structure of a motor 10, according to the first embodiment of the present invention. As shown in FIG. 1, the motor 10 as a permanent magnet electric motor using a permanent magnet is provided with a stator 11 and a rotor 12 which is rotatably supported to a shaft. An opposing face of the stator 11 and an opposing face of the rotor 12 are disposed substantially in parallel to a rotational shaft 13 (of the rotor 12) extending along a center axis direction of the cylindrical rotor 12. The motor 10 is what is called a radial gap motor having an air gap AG between the rotor 12 and the stator 11. The stator 11 and the rotor 12 are stored in a motor case 14. The motor 10 is disposed and driven in such a state that the rotational shaft 13 is laid sideways, in other words, substantially horizontally (the state shown in FIG. 1).

The motor case 14 has a cylindrical case body portion 14a and two disk-like case cover portions 14b, 14c for blocking respective openings on both sides of the case body portion 14a. The case body portion 14a and the case cover portions 14b, 14c are fixed, for example, by means of a bolt 15, so as to bring about a liquid-tight state. The stator 11 wound with a coil winding 16 is fitted to an inner wall face of the case body portion 14a. The rotational shaft 13 passing through a disk face center of each of the case cover portions 14b, 14c is rotatably fitted to the case cover portions 14b, 14c via bearings 17a, 17b respectively.

A rotor reinforcing member 18 for reinforcing the rotor 12 and formed into a cup is fitted to the rotational shaft 13. With respect to the rotor reinforcing member 18, a base face portion 18a as a rotational portion of the rotor 12 is fixed to the rotational shaft 13, for example, by means of a bolt 19 in such a state that the rotational shaft 13 passes through a center portion of the base face portion 18a. An end ring 12a is fitted to an external peripheral end face outside a peripheral face portion 18b of the rotor reinforcing member 18.

Being disposed between the peripheral face portion 18b and the bolt 19 and being spaced apart substantially equidistantly in a circumferential direction, a plurality of through holes 20 (for example, six in number) are opened at the base face portion 18a of the rotor reinforcing member 18. The through hole 20 has a cross sectional shape of an oblong circle for allowing a cooling medium L (refer to FIG. 2) to pass therethrough and passes from a surface (that is, a face on the case cover portion 14b side) of the base face portion 18a through a backface (that is, a face on the case cover portion 14c side) of the base face portion 18a.

A groove 21 which is formed in a form of a circular ring passing below a lower end of the through hole 20 and which opens on the through hole 20 side in such a configuration as to communicate with the through hole 20 is provided on a surface (that is, a face on the case cover portion 14b side) of the base face portion 18a of the rotor reinforcing member 18. The groove 21 functions as a receiver for receiving the cooling medium L before entering the through hole 20.

In addition, in the case cover portion 14b and below the rotational shaft 13, a cooling medium channel 22 serving as a flow channel of the cooling medium L is formed along a radial direction of the case cover portion 14b. In the cooling medium channel 22, an upper end port 22a is positioned close to an upper portion of the groove 21 in such a configuration as to oppose the through hole 20, and a lower end port 22b is positioned on an extension of an inner peripheral face of the case body portion 14a. The upper end port 22a and lower end port 22b are opened on a backface (namely, a face on the rotor 12 side) of the case cover portion 14b. A nozzle 23 is fitted to the upper end port 22a. The nozzle 23 has a tip end portion 23a as a discharge port for discharging the cooling medium L (refer to FIG. 2) sent to the cooling medium channel 22. The tip end portion 23a (discharge port) is disposed close to an upper portion of the groove 21 on a surface (that is, a face on the case cover portion 14b side) of the base face portion 18a which serves as the rotational portion when the motor 10 is rotated.

That is, with respect to the cooling medium channel 22, the upper end port 22a and lower end port 22b are opened in a closed space for receiving the stator 11 and rotor 12 in the motor case 14. The cooling medium channel 22 is formed as a communication channel communicating with the closed space. The tip end portion 23a as a discharge port of the nozzle 23 communicates with the cooling medium channel 22. In such a configuration as to be influenced by an airflow close to the rotor 12 which rotates during rotation of the motor 10, the tip end portion 23a is disposed close to the base face portion 18a as the rotational portion of the rotor 12. That is, the tip end portion 23a is so structured as to face a surface of the base face portion 18a of the rotor reinforcing member 18 in rotation.

Figure 2:
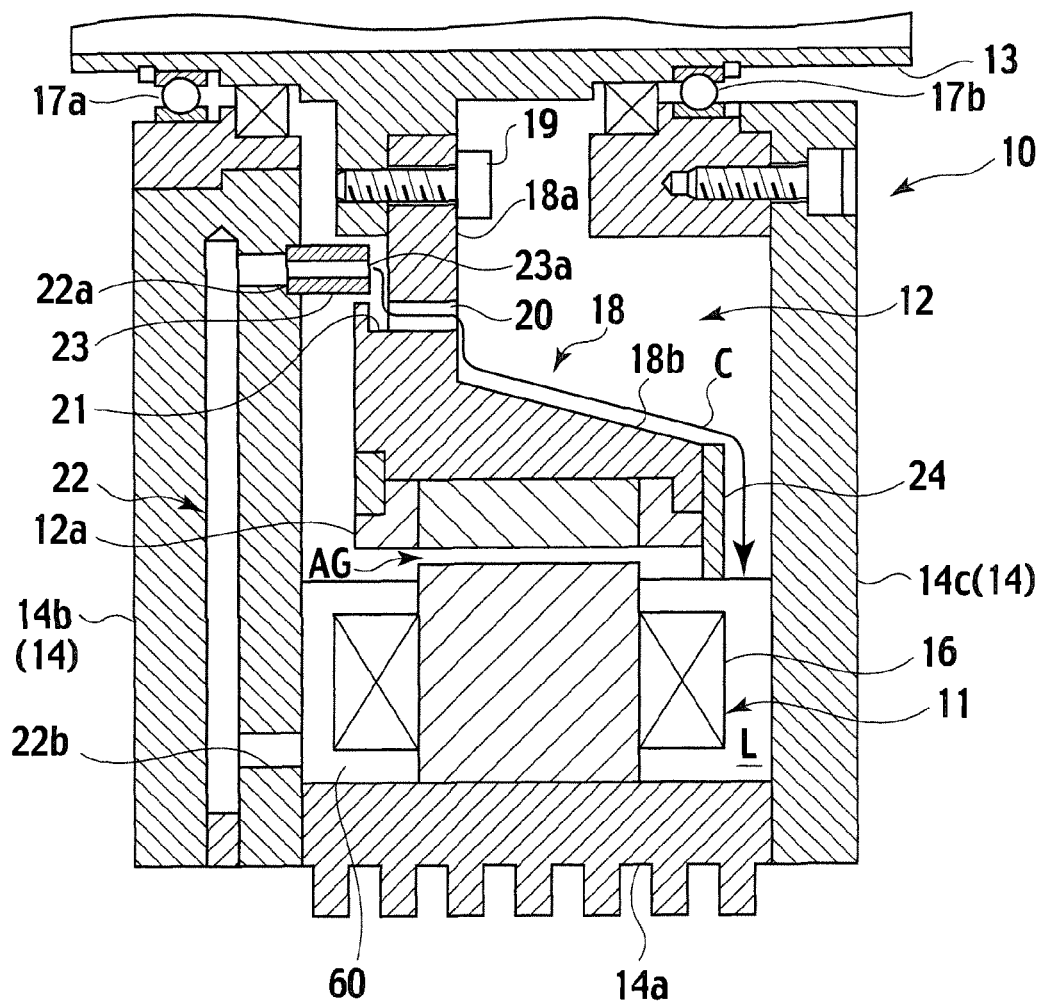
FIG. 2 is an explanatory view of a cross section of a lower half portion of the motor, showing a flow of a cooling medium in the motor in FIG. 1.

FIG. 2 is an explanatory view of a cross sectional view of a lower half portion of the motor 10, showing a flow of the cooling medium L in the motor 10 in FIG. 1. As shown in FIG. 2, the cooling medium L is stored in a closed space base portion (cooling medium storing portion 60) in the motor case 14 in such a configuration as to allow the stator 11 {positioned in the closed space base portion (cooling medium storing portion 60)} in a substantially dipped state. The closed space base portion (cooling medium storing portion 60) which is disposed on the stator 11 side serves as a cooling medium storing portion 60 (reservoir) for storing therein the cooling medium L. That is, the cooling medium channel 22 of the motor 10 is so disposed that the closed space base portion (cooling medium storing portion 60) which is disposed below the tip end portion 23a of the nozzle 23 in the motor case 14 and which stores therein the cooling medium L is connected with the through hole 20 above the rotor 12. The cooling medium channel 22 of the motor 10 leads the cooling medium L from the cooling medium storing portion 60 to the rotor 12.

In addition, as the cooling medium L discharged from the cooling medium channel 22, for example, a cooling liquid is used. However, not limited to the cooling liquid, an automatic transmission fluid (ATF), a cooling oil and the like may be used.

When the motor 10 is driven and then a pressure in the cooling medium channel 22 is decreased according to an increased rotation of the rotor 12, the cooling medium L is lifted from the closed space base portion (cooling medium storing portion 60) in the motor case 14. From the nozzle 23 fitted to the upper end port 22a of the cooling medium channel 22 toward an external face of the base face portion 18a as the rotational portion of the rotor 12, that is, a backface (left face of the rotor 12 in FIG. 2) of the rotor 12, the cooling medium L is discharged during a high speed rotation of the rotor 12.

By means of a centrifugal force, the cooling medium L discharged from the nozzle 23 is likely to flow in an outer radial direction (in a direction of the stator 11) of the rotor 12 by way of a backface of the rotor 12. However, the cooling medium L is received by the groove 21 opened in an inner radial direction (in a direction of the rotational shaft 13) of the rotor 12, and then is temporarily held in the groove 21.

The cooling medium L temporarily held in the groove 21 passes through the through hole 20 communicating with the groove 21, and then flows out to an inner peripheral portion of the rotor 12, that is, an inner face of the peripheral face portion 18*b* of the rotor reinforcing member 18. The cooling medium L discharged to the backface side of the rotor 12 can be led, by means of the through hole 20, to a surface side (inner peripheral side of the rotor reinforcing member 18) of the rotor 12, thus efficiently cooling the surface side of the rotor 12. In addition, by means of the groove 21, the cooling medium L flowing into the surface side (inner peripheral face side of the rotor reinforcing member 18) of the rotor 12 can be prevented from being decreased.

As set forth above, the cooling medium L flows out to the peripheral face portion 18*b*. Since an inner radial side (base face portion 18*a* side) is larger in diameter than an outer radial side (tip end of the peripheral face portion 18*b*), the centrifugal force pushes the cooling medium L in a direction of the tip end of the peripheral face portion 18*b*, that is, in a direction of an opening portion of the rotor 12.

From the tip end of the peripheral face portion 18*b*, the cooling medium L flowing in the inner face of the peripheral face portion 18*b* of the rotor reinforcing member 18 is further pushed in an outer radial direction of the rotor 12. In this operation, for preventing the cooling medium L from flowing into the air gap AG, a plate 24 is fitted to the tip end of the peripheral face portion 18*b* of the rotor reinforcing member 18.

The cooling medium L flowing on an inner face of the rotor 12 (peripheral face portion 18*b* of the rotor reinforcing member 18) goes off from the end portion of the rotor 12. The tip end portion (lower portion in FIG. 2) of the plate 24 enters the stator 11 side in such a configuration as to block the air gap AG. In this way, the plate 24 is disposed at the end portion (end portion of peripheral face portion 18*b*) of the rotor 12. The plate 24 blocks the air gap AG between the rotor 12 and the stator 11. With this, the plate 24 prevents the going-off cooling medium L from entering the air gap AG. With this, the cooling medium L which is not supposed to enter the air gap AG does not cause a viscosity resistance which may be caused by the going-off cooling medium L.

In this way, during the rotation of the rotor 12, the cooling medium L discharged from the nozzle 23 flows along the inner face of the peripheral face portion 18*b* of the rotor reinforcing member 18 (refer to an arrow C in FIG. 2), to thereby cool the inner peripheral portion of the rotor 12.

That is, the rotor reinforcing member 18 of the rotor 12 has a downward slanting face along the direction of the rotational shaft 13. With the rotor 12's heat absorbed by the cooling medium L while moving the cooling medium L, the slanting face of the rotor reinforcing member 18 allows the cooling medium L to go off from the rotor 12 (rotor reinforcing member 18) by means of the centrifugal force caused during the rotation of the rotor 12. Thereby, the rotor reinforcing member 18 which is shaped into a cup and has the inner diameter enlarged toward the opening portion blows the cooling medium L out of the rotor 12 after the heat of the inner peripheral portion of the rotor 12 is absorbed.

In addition, using the cooling liquid as the cooling medium L increases the cooling efficiency. Moreover, in view of a specific gravity relation between a negative pressure and the cooling medium L, using the cooling liquid as the cooling medium suppresses the discharge of the cooling medium L during the low speed rotation of the rotor 12. With this, a cooler having a good cooling efficiency and a good rotation efficiency can be made.

That is, in the motor 10, during the high speed rotation of the rotor 12, the air in the vicinity of the rotor 12 has a high flowrate, thus causing a negative pressure by the Bernoulli effect. Now therefore, from the closed space base portion (cooling medium storing portion 60) inside the motor case 14, that is, from the cooling medium storing portion 60 for storing the cooling medium L, the cooling medium L is sucked up. Then, the cooling medium L can be blown to the rotor 12 from the tip end portion 23*a* of the nozzle 23. In addition, during the low speed rotation of the rotor 12, from the specific gravity relation between the negative pressure and the cooling medium L, some negative pressures during the low speed rotation do not allow the cooling medium L to be discharged. Such being the case, the viscosity resistance by the cooling medium L is not caused.

In addition, during the stop of the rotor 12, the surface of the cooling medium L stored in the cooling medium storing portion 60 is disposed in a position lower than the air gap AG (outside in the radial direction of rotor 12). Therefore, since the cooling medium L is not intervened in the air gap AG face, the viscosity resistance between the stator 11 and the rotor 12 can be decreased.

Moreover in FIG. 2, the lower end port 22*b* of the cooling medium channel 22 is opened toward the rotor 12 side of the case cover portion 14*b*. However, the lower end port 22*b* of the cooling medium channel 22 may be opened toward the case body portion 14*a* side of the case cover portion 14*b* (refer to FIG. 1). For allowing the sucking-in of the cooling medium L stored in the closed space base portion (cooling medium storing portion 60) in the motor case 14, it is enough that the lower end port 22*b* is opened in the vicinity of the base face of the closed space base portion (cooling medium storing portion 60).

Then, the ATF level and ATF discharge flowrate in the negative pressure state in the case that the ATF is used as the cooling medium L is to be set forth.

Figure 3:
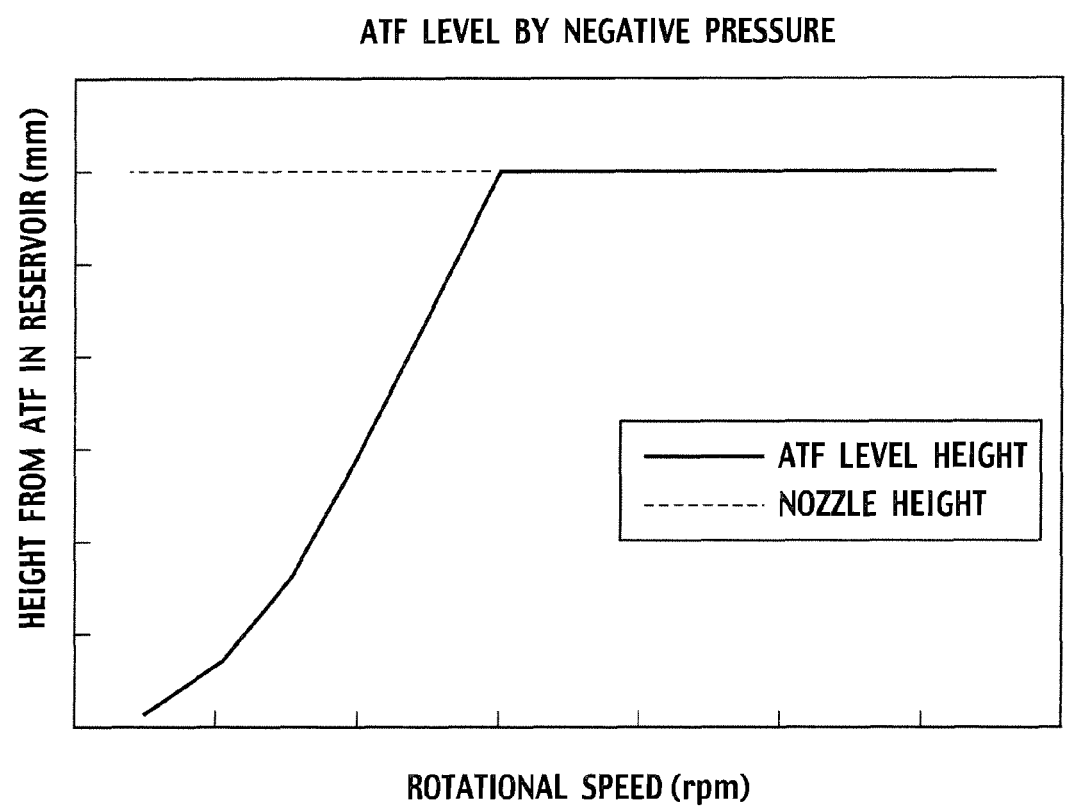
FIG. 3 is an explanatory view where an ATF (Automatic Transmission Fluid) level by a negative pressure is denoted by a graph.

FIG. 3 is an explanatory view where the ATF level by the negative pressure is denoted by a graph. As shown in FIG. 3, when the cooling medium L (ATF) present in the cooling medium channel 22 is sucked by the negative pressure, the sucked-up height (ATF level), that is, the height (mm) from the ATF level in the cooling medium storing portion 60 for storing the ATF is increased according to an increase of the rotational speed (rpm) of the rotor 12.

When the height of the ATF present in the cooling medium channel 22 is increased and reaches the height at which the nozzle 23 is disposed, discharging of the ATF from the nozzle 23 is started. The discharge quantity of the ATF from the nozzle 23 is increased according to the increase of the rotational speed. Therefore, at the rotational speed equal to or higher than the rotational speed of the rotor 12 during the discharging of the ATF from the nozzle 23, the height of the ATF (ATF level) in the cooling medium channel 22 remains unchanged, keeping the height same as that of the nozzle 23.

Figure 4:
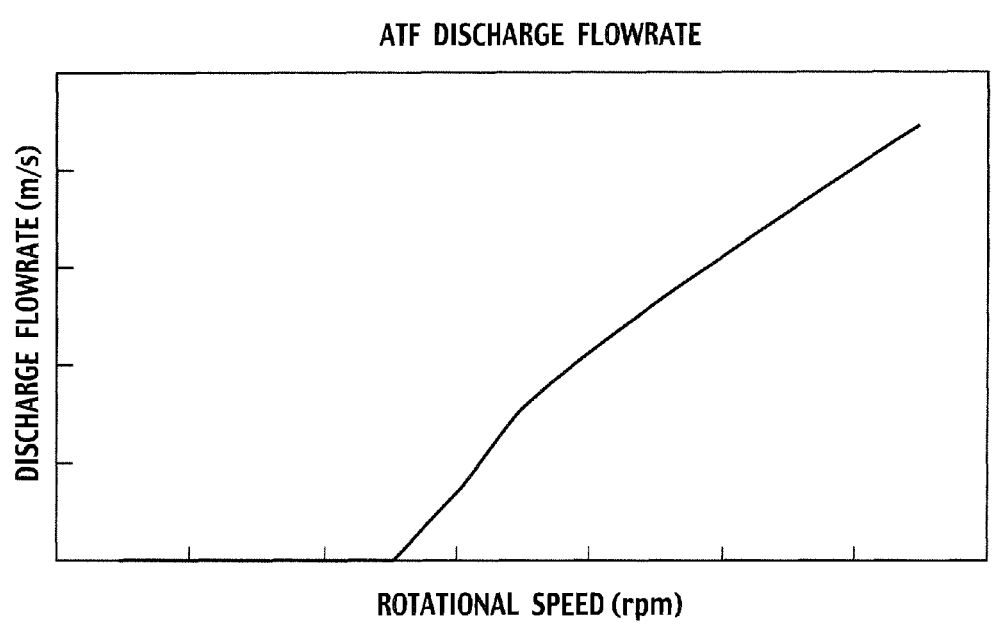
FIG. 4 is an explanatory view where an ATF discharge flowrate is denoted by a graph.

FIG. 4 is an explanatory view where the ATF discharge flowrate is denoted by a graph. As shown in FIG. 4, at the rotational speed equal to or higher than the rotational speed (discharge rotational speed) of the rotor 12 during the discharging of the ATF from the nozzle 23, the discharge quantity of the ATF from the nozzle 23 is increased according to the increase of the rotational speed. That is, the discharge flowrate (m/s) is increased. In addition, at the rotational speed less than the discharge rotational speed, only the height of the ATF in the cooling medium channel 22 changes, while not discharging the ATF.

(Second Embodiment)

Figure 5A:
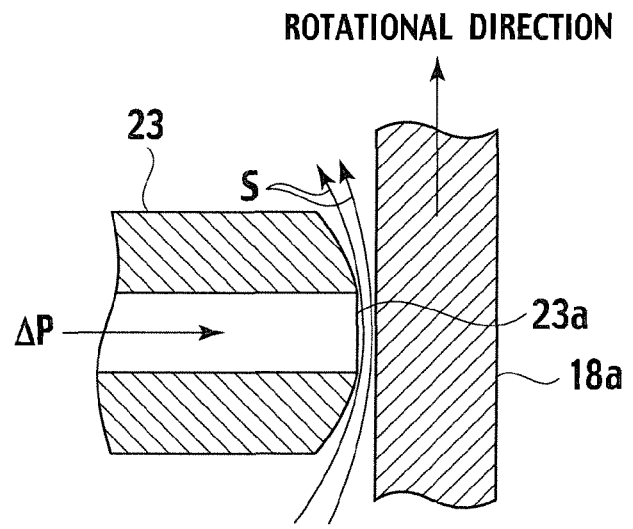
Figure 5B:
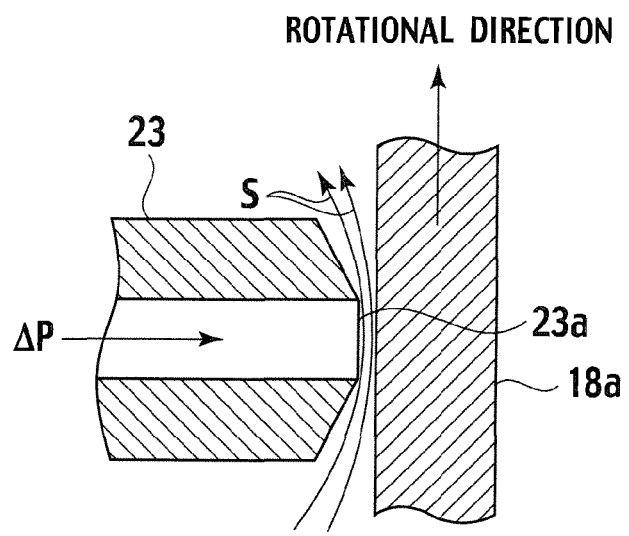
FIG. 5B is an explanatory view of a cross section of a multifaceted structure.

FIG. 5A and FIG. 5B each show the tip end portion 23a (discharge port), according to the second embodiment of the present invention. FIG. 5A is an explanatory view of a cross section of a curved structure while FIG. 5B is an explanatory view of a cross section of a multifaceted structure. As shown in FIG. 5A and FIG. 5B, the nozzle 23 fitted to the upper end port 22a of the cooling medium channel 22 is formed with the tip end portion 23a which is curved (refer to FIG. 5A) or multifaceted (refer to FIG. 5B) each in a form of a dome protruding toward the base face portion 18a side. That is, the tip end portion 23a for discharging the cooling medium L is formed into a protrusion opposed to the base face portion 18a of the rotor reinforcing member 18. Other structures and operations according to the second embodiment are like those of the motor 10 (refer to FIG. 2) according to the first embodiment.

Having the above structure and by the venturi effect, the flowrate of the rotating fluid at the tip end portion 23a (discharge port), that is, in the vicinity of the discharge portion of the cooling medium L is increased (refer to arrows S in FIG. 5A and FIG. 5B), compared with the place other than the area in the vicinity of the discharge port. Thereby, the negative pressure is more likely to be caused to the tip end portion 23a. With this, more cooling medium L can be sucked up (absorbed) from the cooling medium storing portion 60.

(Third Embodiment)

Figure 6:
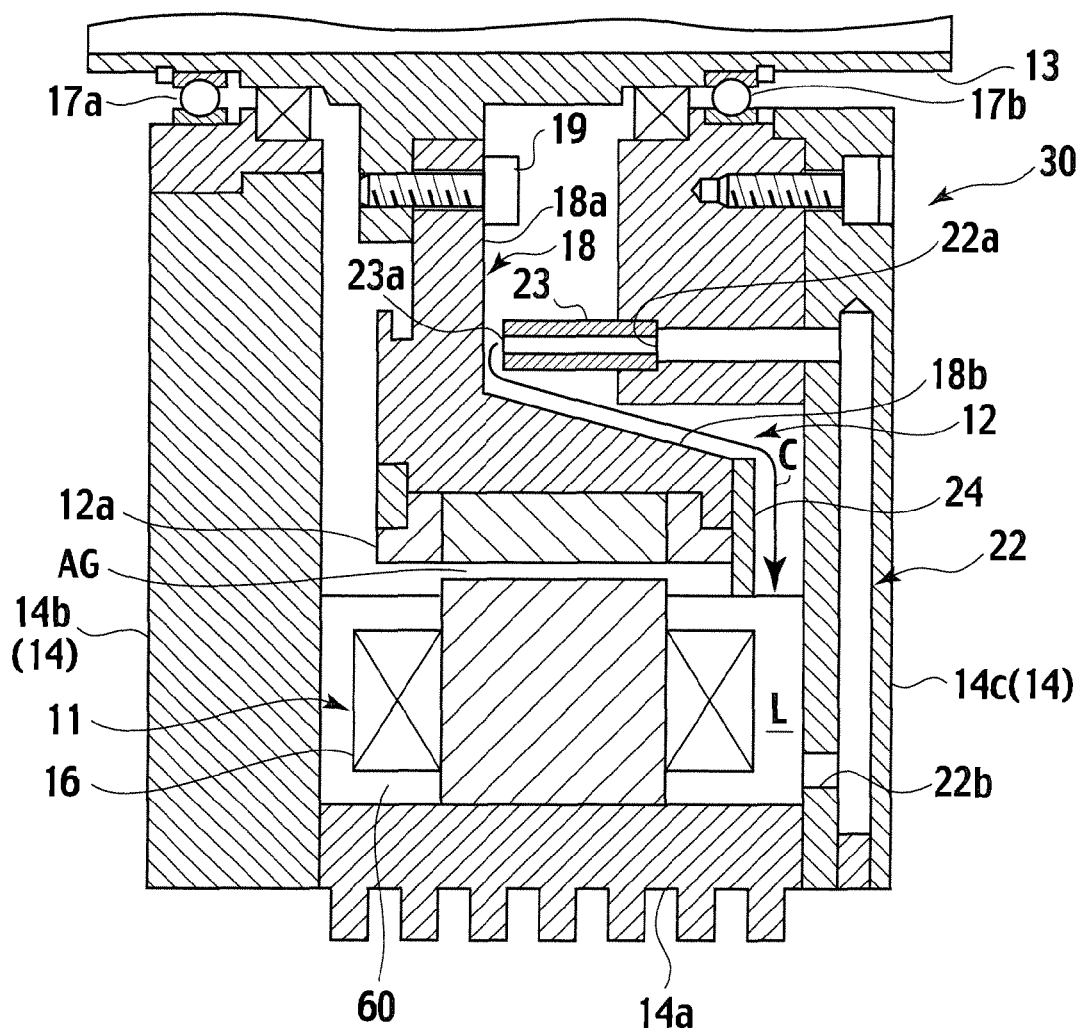
FIG. 6 is an explanatory view of a cross section of a lower half portion of the motor, showing the flow of the cooling medium, according to the third embodiment of the present invention.

FIG. 6 is an explanatory view of a cross section of a lower half portion of a motor 30, showing a flow of the cooling medium L, according to the third embodiment of the present invention. As shown in FIG. 6, the motor 30 has such a structure that the cooling medium channel 22 which was formed in the case cover portion 14b according to the first embodiment is formed in the case cover portion 14c and the nozzle 23 fitted to the upper end port 22a faces toward the rotor reinforcing member 18's opening portion side which is an opening portion side of the rotor 12. Other structures and operations according to the third embodiment are like those of the motor 10 (refer to FIG. 2) according to the first embodiment.

As set forth above, during the rotation of the rotor 12, the cooling medium L discharged from the nozzle 23 toward the base face portion 18a of the rotor reinforcing member 18 flows down along the inner face of the peripheral face portion 18b (refer to arrow C in FIG. 6), to thereby cool the inner peripheral portion of the rotor 12.

With the above structure, compared with the case that the cooling medium L is discharged toward the backface (left face of the rotor 12 in FIG. 6) of the rotor 12 (refer to FIG. 2), it is not necessary to make the through hole 20 in the rotor 12, to thereby making it possible to set the rotor 12's rotational strength high.

(Fourth Embodiment)

Figure 7:
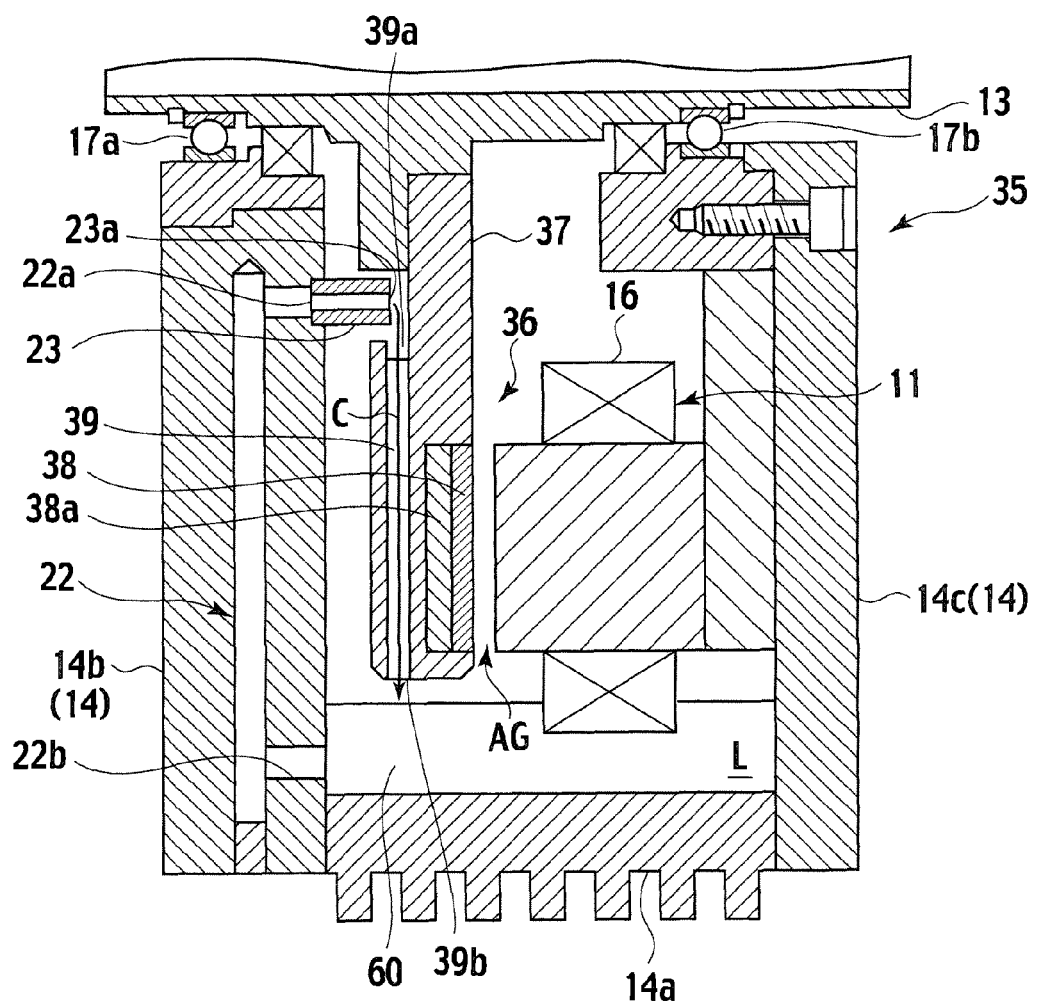
FIG. 7 is an explanatory view of a cross section of a lower half portion of the motor, showing the flow of the cooling medium, according to the fourth embodiment of the present invention.

FIG. 7 is an explanatory view of a cross section of a lower half portion of a motor 35, showing a flow of the cooling medium L, according to the fourth embodiment of the present invention. As shown in FIG. 7, the motor 35 has such a structure that the opposing face of the stator 11 and the opposing face of the rotor 36 are disposed perpendicularly with respect to the rotational shaft 13 extending along the center axis direction of the rotor 36. The motor 35 is what is called an axial gap motor having the air gap AG between the rotor 36 and the stator 11. Other structures and operations according to the fourth embodiment are like those of the motor 10 (refer to FIG. 2) according to the first embodiment.

The rotor 36 has a rotor reinforcing member 37 which reinforces the rotor 36 and which is formed into a disk. In a portion where the rotor reinforcing member 37 opposes the stator 11, the rotor reinforcing member 37 has a plurality of permanent magnets 38 each arranged in an embedded state along a circumferential direction of the rotor reinforcing member 37. Moreover, the rotor reinforcing member 37 has a back yoke 38a disposed on the backside of the permanent magnet 38. On the back yoke 38a's backface side which is a face opposite to the face on the rotor reinforcing member 37's air gap AG side, there is formed a cooling medium channel 39 passing through the rotor reinforcing member 37 in the radial direction of the rotor reinforcing member 37.

The cooling medium channel 39 has such a structure that an upper end port 39a is opened below the nozzle 23 in such a configuration as to face the tip end portion 23a (discharge port) of the nozzle 23 and a lower end port 39b is opened in the external peripheral end face of the rotor reinforcing member 37 in such a configuration as to face the cooling medium L stored in the closed space base portion (cooling medium storing portion 60) in the motor case 14.

With the above structure, it is possible to suck or discharge the cooling medium L from the nozzle 23 only during the high speed rotation of the rotor 36. Thereby, the cooling medium L discharged from the nozzle 23 passes through the cooling medium channel 39 (refer to arrow C in FIG. 7) and flows down to the closed space base portion (cooling medium storing portion 60), to be stored therein. In addition, disposing the cooling medium channel 39 in the rotor 36 can cool an area in the vicinity of the back yoke 38a, that is, an area in the vicinity of a heated portion, thus improving the cooling performance.

(Fifth Embodiment)

Figure 8:
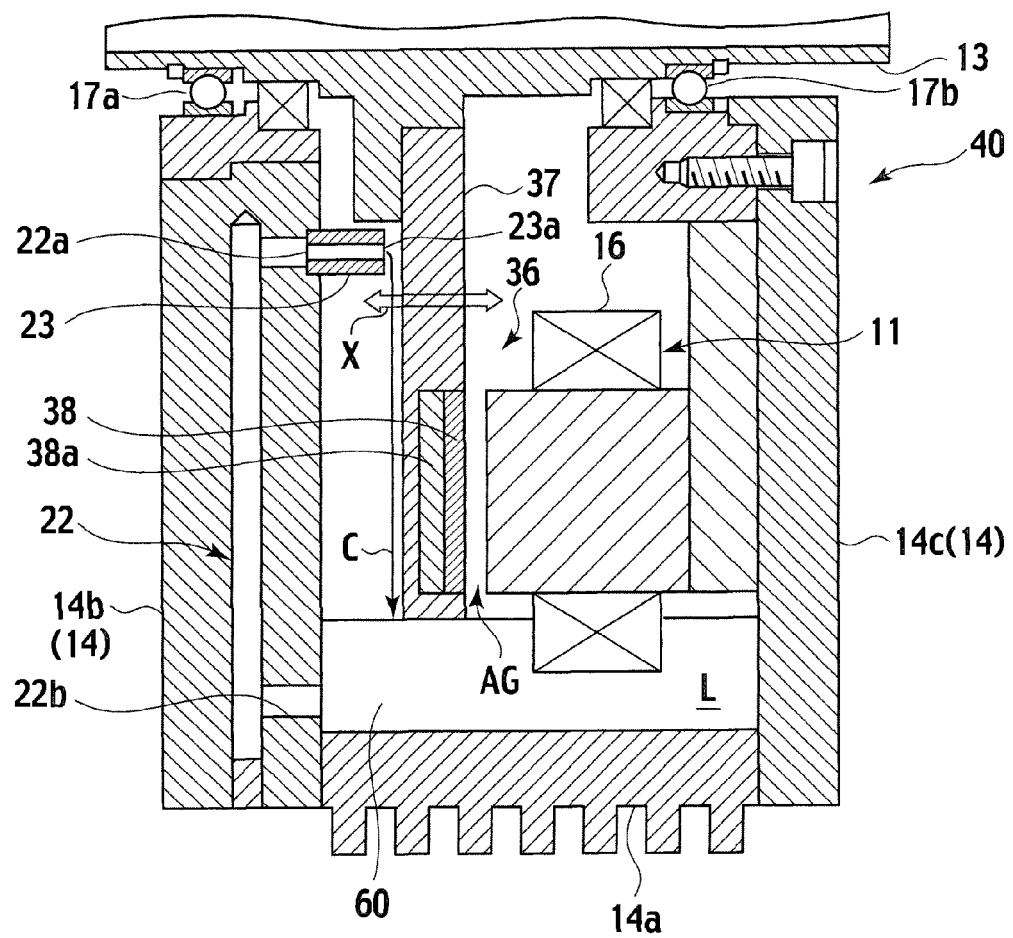
FIG. 8 is an explanatory view of a cross section of a lower half portion of the motor, showing the flow of the cooling medium, according to the fifth embodiment of the present invention.

FIG. 8 is an explanatory view of a cross section of a lower half portion of a motor 40, showing a flow of the cooling medium L, according to the fifth embodiment of the present invention. As shown in FIG. 8, the motor 40 is a variable axial gap motor which has such a structure that the rotor 36 moves toward the stator 11 and away from the stator 11 (refer to a solid white arrow X denoting a variable gap structure in FIG. 8), to thereby vary the air gap AG between the rotor 36 and the stator 11.

In the motor 40, the tip end portion 23a as the discharge port for discharging the cooling medium L is positioned in the vicinity of the backface which is a sideface of the rotor reinforcing member 37 and which is a sideface opposite to the face on the air gap AG side. Thereby, the tip end portion 23a is so rendered as to face the backface of the rotor reinforcing member 37. That is, the tip end portion 23a (discharge port) of the nozzle 23 is disposed in the vicinity of the rotation position of the rotor 36. Other structures and operations according to the fifth embodiment are like those of the motor 10 (refer to FIG. 2) according to the first embodiment.

With the above structure, when the air gap AG is enlarged, in other words, when decreasing an induced voltage during the high speed rotation of the rotor 36, the rotor 36 moves away from the stator 11, thus shortening the distance between the rotor 36 and the tip end portion 23a (discharge portion), to thereby discharge the cooling medium L from the tip end portion 23a (discharge port). The cooling medium L discharged from the nozzle 23 moves on the backface of the rotor reinforcing member 37 (refer to the arrow C in FIG. 8) and flows down to the closed space base portion (cooling medium storing portion 60), to be stored therein.

(Six Embodiment)

Figure 9:
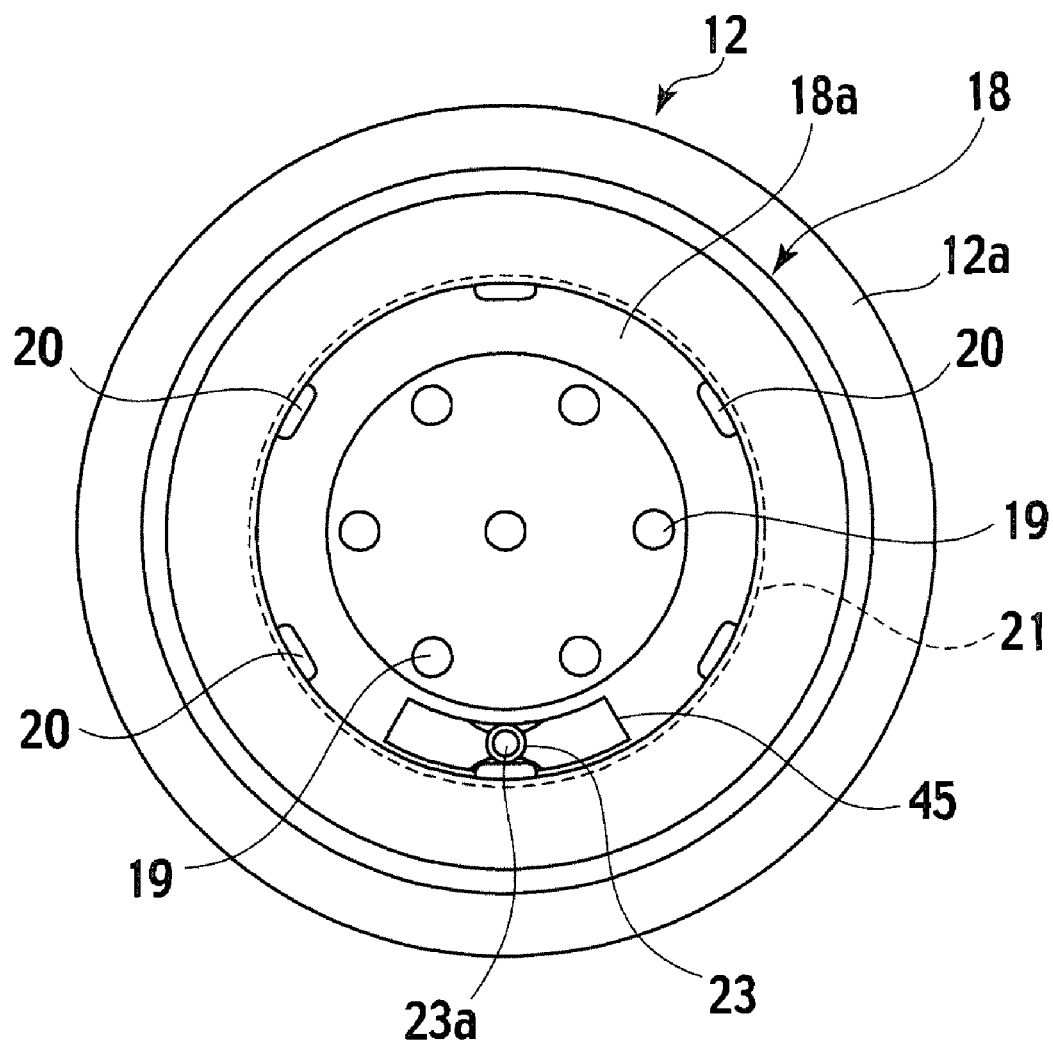
FIG. 9 is an explanatory view on a rotor's backside as a nozzle's opposing face which shows the tip end portion of the nozzle, according to the six embodiment of the present invention.
Figure 10A:
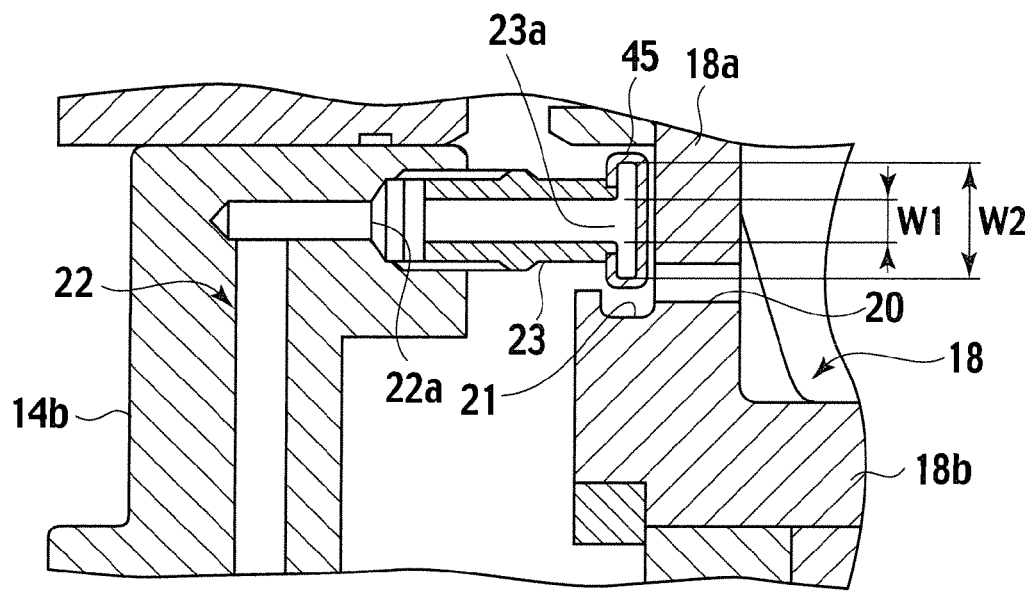
Figure 10B:
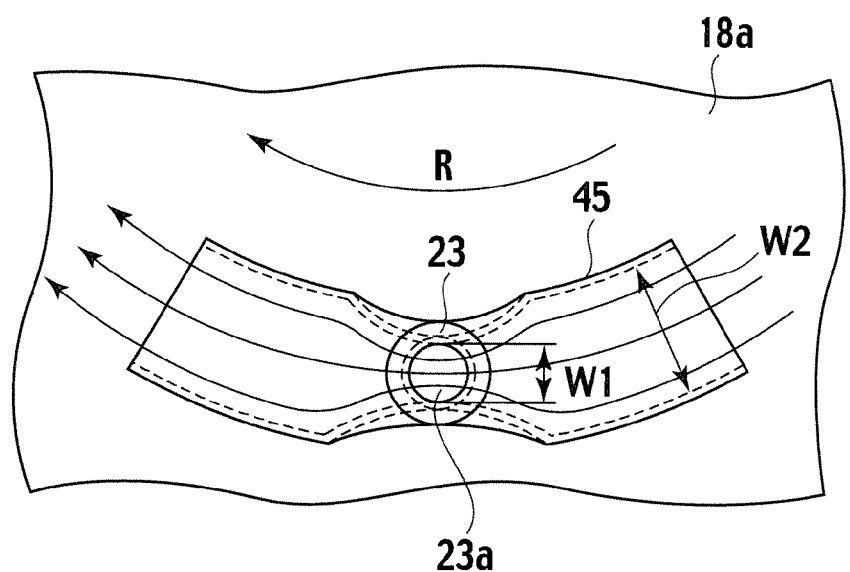
FIG. 10B is an explanatory view of a cross section of the nozzle.

FIG. 9 is an explanatory view of the rotor 12's backside as a nozzle opposing face which shows the tip end portion 23a of the nozzle 23, according to the six embodiment of the present invention. FIG. 10A and FIG. 10B each show an enlarged view of the tip end portion 23a of the nozzle 23 in FIG. 9, where FIG. 10A is a plan explanatory view of the nozzle 23 while FIG. 10B is an explanatory view of a cross section of the nozzle 23.

As shown in FIG. 9. a tubular tip end flow channel forming portion (flow channel forming portion) 45 (refer to FIG. 10A and FIG. 10B) is fitted to the tip end portion 23a of the nozzle 23. The tip end flow channel forming portion 45 has such a structure that the flow channel is formed in the circumferential direction of the rotor 12, that is, along the circumferential direction of the base face portion 18a of the rotor reinforcing member 18, and openings are defined on both sides in the circumferential direction of the base face portion 18a. On both sides in the circumferential direction of the base face portion 18a of the rotor reinforcing member 18, the discharge port (tip end portion 23a) of the nozzle 23 is opened by the tip end flow channel forming portion 45. Other structures and operations according to the sixth embodiment are like those of the motor 10 (refer to FIG. 2) according to the first embodiment.

As shown in FIG. 10A and FIG. 10B. the tip end flow channel forming portion 45 has such a structure that a substantially middle portion in the longitudinal direction of the tip end flow channel forming portion 45 is fitted to the tip end portion 23a of the nozzle 23 in such a configuration as to cover the tip end portion 23a. An external face of the tip end flow channel forming portion 45 fitted to the tip end portion 23a of the nozzle 23 is brought into such a state as to almost contact the base face portion 18a of the rotor reinforcing member 18 (refer to FIG. 10A). In addition, the tip end flow channel forming portion 45 has such a structure that a flow channel width W1 of a connector portion with the tip end portion 23a of the nozzle 23 is shorter than a flow channel width W2 of at least one open portion, that is, an opening width in the radial direction of the base face portion 18a of the rotor reinforcing member 18 (refer to FIG. 10B). Now therefore, the air passing through the tip end flow channel forming portion 45 according to the rotation (refer to the arrow R in FIG. 10B) of the rotor 12 is allowed to pass through the flow channel having such a structure that an inlet and an outlet are wide while a center portion communicating with the nozzle 23 is narrow (refer to the arrow R in FIG. 10B).

With the above structure, compared with the case that only the tip end portion 23a of the nozzle 23 is disposed in the vicinity of the base face portion 18a of the rotor reinforcing member 18, more fluid can be taken into the tip end portion 23a of the nozzle 23, thus making it possible to discharge more cooling medium L from the nozzle 23. In addition, in the tip end flow channel forming portion 45, the center portion (tip end portion 23a of the nozzle 23) is made narrower than in the vicinity of the outlet and inlet, to thereby bring about the venturi effect, thus discharging more cooling medium L. In addition, the tip end flow channel forming portion 45 is disposed higher than the groove 21 which is disposed at the base face portion 18a of the rotor reinforcing member 18 and which receives the cooling medium L, thus improving accuracy of assembling the motor 10.

In addition, other than being formed into a tube, the tip end flow channel forming portion 45 may be in a form of a groove where the base face portion 18a side is opened.

(Seventh Embodiment)

Figure 11:
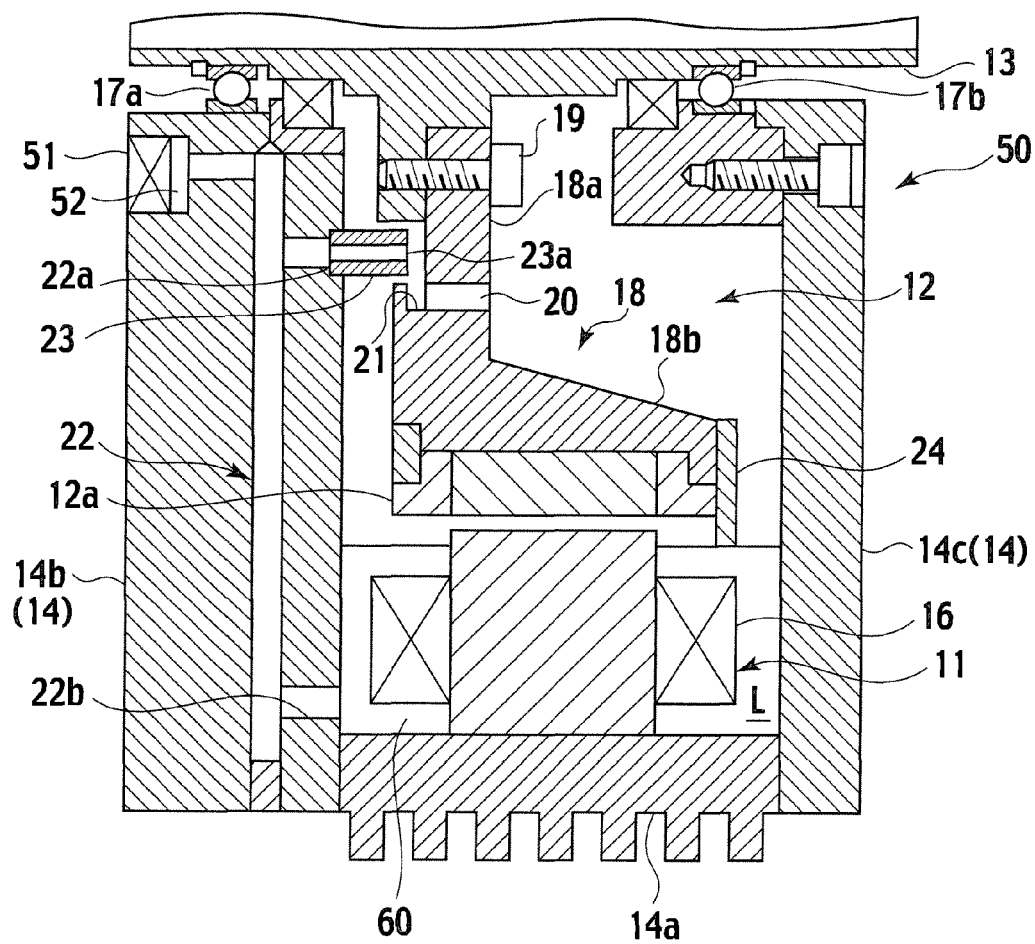
FIG. 11 is an explanatory view of a cross section of a lower half portion of the motor, according to the seventh embodiment of the present invention.

FIG. 11 is an explanatory view of a cross section of a lower half portion of a motor 50, according to the seventh embodiment of the present invention. As shown in FIG. 11, the motor 50 has such a structure that a pressure adjusting valve 51 and a filter 52 are disposed in a position higher (that is, the rotational shaft 13 side) than the upper end port 22a as the cooling medium L's discharge portion of the case cover portion 14b.

In the pressure adjusting valve 51, a communication port communicating with the atmosphere is opened on an outer surface of the case cover portion 14b. The pressure adjusting valve 51 makes a control between the atmosphere and the negative pressure in the cooling medium channel 22. In addition, the filter 52 filters the atmosphere which is introduced from external portion into the closed space in the motor case 14 via the pressure adjusting valve 51. Other structures and operations according to the seventh embodiment are like those of the motor 10 (refer to FIG. 2) according to the first embodiment.

The pressure adjusting valve 51 has a function to sense the temperature of the stator 11. That is, the pressure adjusting valve 51 senses the temperature of the coil wiring (stator wiring) 16 of the stator 11 or the temperature of the stator iron core. According to the thus sensed temperatures, the pressure adjusting valve 51 is opened or closed, to thereby allow the internal pressure of the cooling medium channel 22 to be equal to the internal pressure of the motor 50 or bring about a negative pressure state caused during the rotation of the rotor 12. That is, when the temperature of the coil wiring 16 or the temperature of the stator iron core is low, the pressure adjusting valve 51 allows the pressure in the cooling medium channel 22 to be equal to the internal pressure of the motor 50 or the external atmospheric pressure, while when the temperature of the coil wiring 16 or the temperature of the stator iron core is high, the pressure adjusting valve 51 allows the pressure in the cooling medium channel 22 to be the negative pressure caused by the rotor 12.

With the above structure, during the high load operation where the cooling during the high speed driving of the motor 50 is needed, the pressure adjusting valve 51 is rendered to be in a closed state. On the other hand, when the cooling is not needed even during the high speed driving of the motor 50, for example, when the magnetic flux density is small or during a cool area traveling and the like, the pressure adjusting valve 51 is rendered to be in an open state. With the pressure adjusting valve 51 in the open state and thereby allowing the negative pressure in the cooling medium channel 22 come close to the atmospheric pressure, the cooling medium L can be prevented from being discharged from the nozzle 23. In this way, even during the high speed rotation of the motor 50, the viscosity resistance which may be caused between the rotor 12 and the cooling medium L can be decreased during the low load operation, thus accomplishing a cooling control corresponding to the output sensitivity during the high speed driving of the motor 10.

In addition, when introducing the external atmosphere into the closed space in the motor case 14, the filter 52 disposed between the pressure adjusting valve 51 and the nozzle 23 can remove contaminants such as those in the atmosphere.

(Eighth Embodiment)

Figure 12:
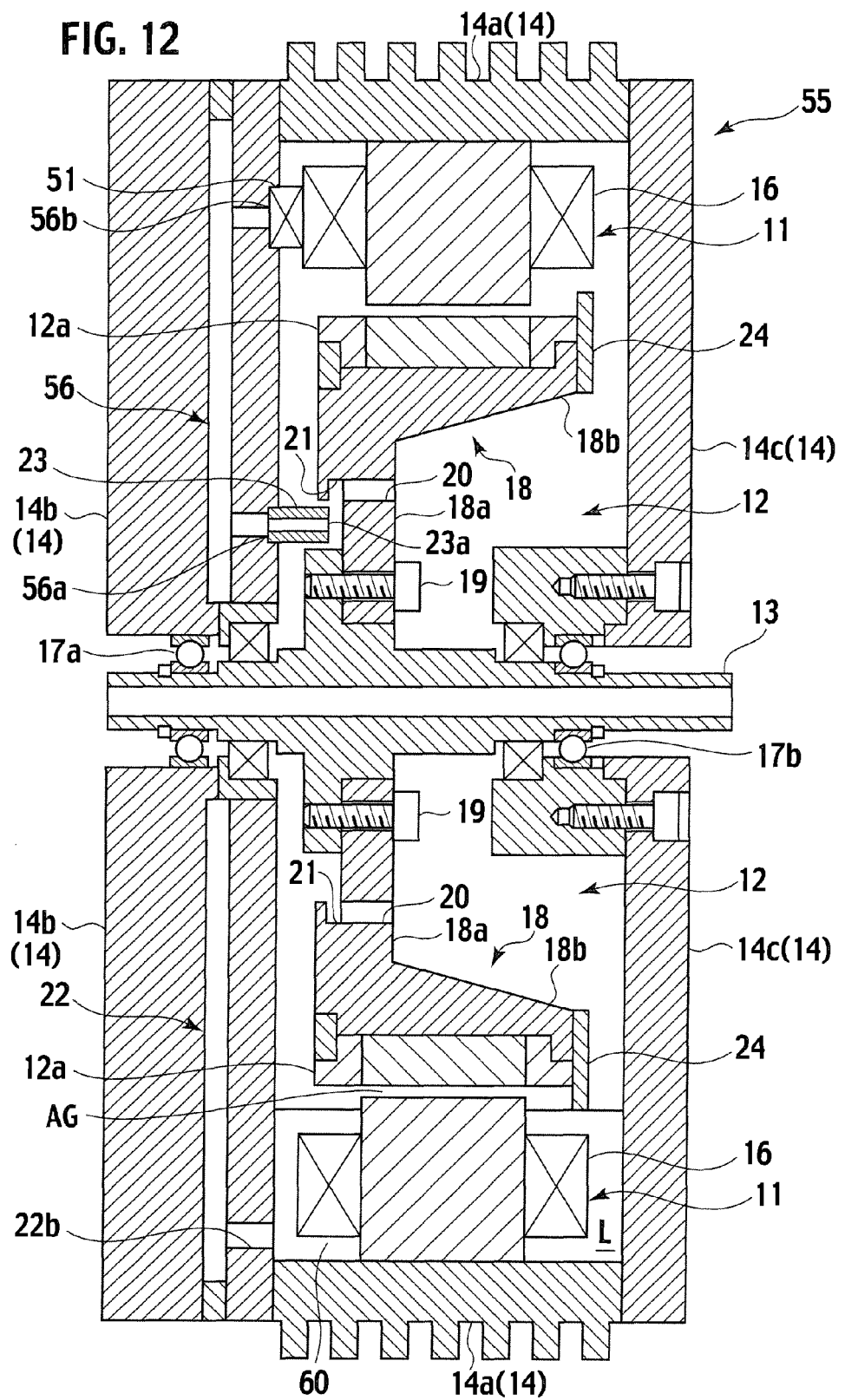
FIG. 12 is an explanatory view of a cross section of the motor, according to the eighth embodiment of the present invention.

FIG. 12 is an explanatory view of a cross section of a motor 55, according to the eighth embodiment of the present invention. As shown in FIG. 12, the motor 55 has such a structure that the pressure adjusting valve 51 for controlling the atmosphere and the negative pressure in the cooling medium channel 22 is disposed in the motor case 14. Corresponding to this structure, an upper cooling medium channel 56 communicating with the cooling medium channel 22 is disposed, and the nozzle 23 is fitted to the upper cooling medium channel 56, instead of the cooling medium channel 22. Other structures and operations according to the eighth embodiment are like those of the motor 10 (refer to FIG. 2) according to the first embodiment.

The upper cooling medium channel 56 is disposed at the upper half portion of the case cover portion 14b. In place of the upper end port 22a (FIG. 2) formed at the cooling medium channel 22, an upper portion lower end port 56a opened in the vicinity of the lower portion of the groove 21 formed at the base face portion 18a of the rotor reinforcing member 18 is disposed at the upper cooling medium channel 56. The nozzle 23 is fitted to the upper portion lower end port 56a. At the nozzle 23, the tip end portion 23a (discharge port) closely opposes the surface (that is, the face on the case cover portion 14b side) of the base face portion 18a at the lower portion of the groove 21.

Moreover, in the stator 11, the upper cooling medium channel 56 has an upper portion upper end port 56b which is opened in a position opposing the coil wiring 16. To the upper portion upper end port 56b, the pressure adjusting valve 51 is fitted, for example, in such a state as to contact the coil wiring 16. As the pressure adjusting valve 51, for example, a temperature sensitive valve which includes bimetal, thermoelectric element and the like is used.

Figure 13:
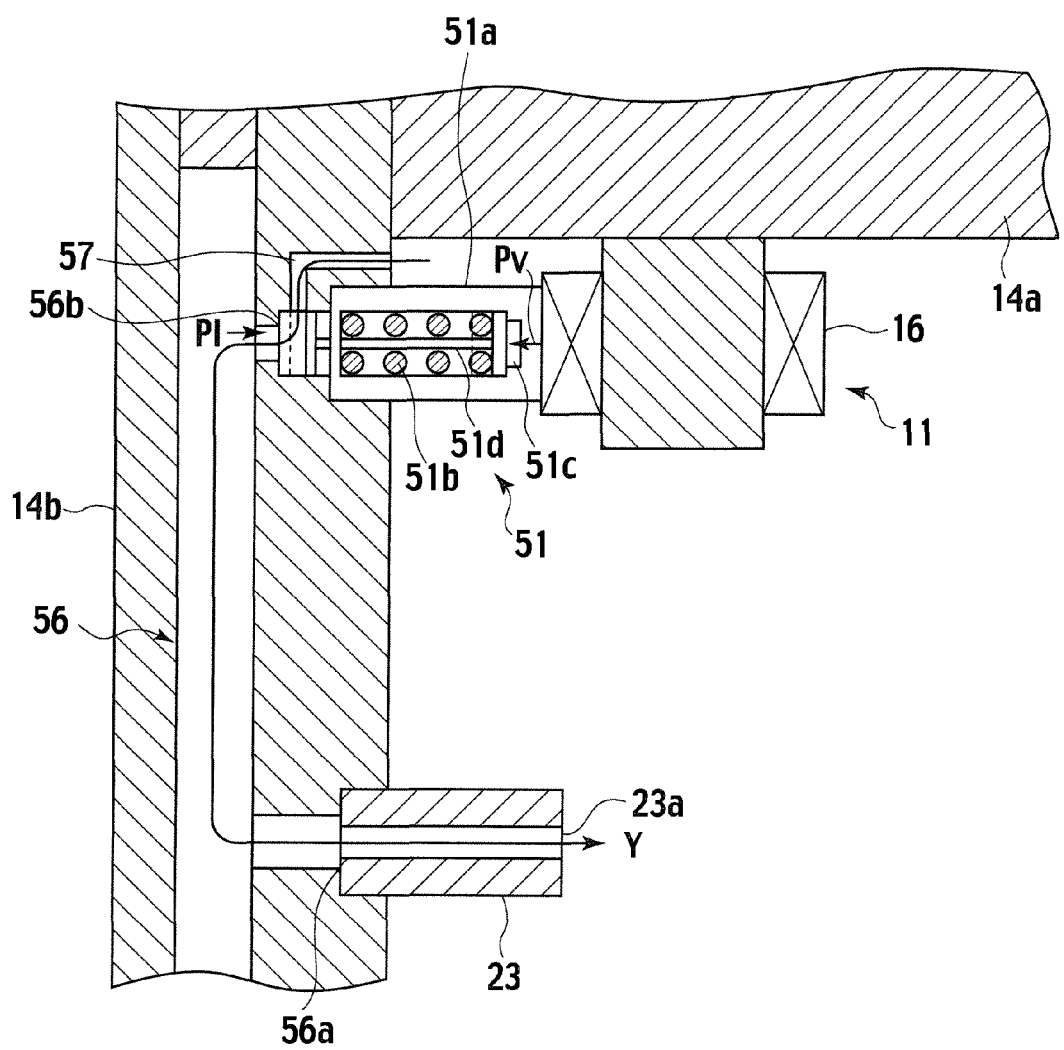
FIG. 13 is a detailed explanatory view of a pressure adjusting valve in FIG. 12.

FIG. 13 is a detailed explanatory view of the pressure adjusting valve 51 in FIG. 12. As shown in FIG. 13, the pressure adjusting valve 51 includes, for example, a temperature sensitive valve for controlling operations of a piston 51d which moves forward and backward relative to a cylinder 51a by means of a biasing member (coil spring) 51b and a temperature sensitive metal 51c which are disposed in the cylinder 51a. In addition, via an internal communication channel 57 disposed in the case cover portion 14b, the upper portion upper end port 56b communicates with an inner space of the motor case 14. The forward and backward movements of the piston 51d open and close the internal communication channel 57.

In the pressure adjusting valve 51 including the temperature sensitive valve, the scale of the temperature sensitive metal 51c remains unchanged (that is, keeping the normal condition) when the coil wiring 16 has a low temperature. According to the rotation of the rotor 12 faced by the upper portion lower end port 56a, a negative pressure P1 state of the upper cooling medium channel 56 changes. According to the negative pressure P1 state, the biasing force of the biasing member 51b pushes up the piston 51d. With this, the internal communication channel 57 is brought into an open state, and then the air in the atmospheric pressure state in the internal space of the motor case 14 enters the upper cooling medium channel 56 via the internal communication channel 57 (refer to an arrow Y in FIG. 13), thus solving the negative pressure P1 state of the upper cooling medium channel 56.

On the other hand, when the temperature of the coil wiring 16 is increased, the thus increased temperature is transmitted to the temperature sensitive metal 51c. to thereby causes an expansion Pv to the temperature sensitive metal 51c. With the temperature sensitive metal 51c having the expansion Pv, the piston 51d goes beyond the biasing force of the biasing member 51b and thereby is brought into the forward moving state (leftward in FIG. 13), to thereby allow the internal communication channel 57 to be brought into a closed state. With this, the negative pressure P1 state in the upper cooling medium channel 56 is kept and the cooling medium L stored in the closed space base portion (cooling medium storing portion 60) in the motor case 14 is sucked via the cooling medium channel 22 to the upper cooling medium channel 56, to thereby discharge the cooling medium L toward the blackface (the base face portion 18a of the rotor reinforcing member 18) of the rotor 12 from the tip end portion 23a (discharge port) of the nozzle 23. In addition, metals, bimetals and the like having a high thermal expansion ratio are used for the temperature sensitive metal 51c.

In this way, the pressure adjusting valve 51 including the temperature sensitive valve is so disposed in a state as to contact or to be close to the coil wiring 16. Thereby, during the high load operation of the motor 55, the pressure adjusting valve 51 is brought into the closed state to thereby discharge the cooling medium L from the nozzle 23, while during the low load operation, the pressure adjusting valve 51 is brought into the open state to thereby prevent the cooling medium L from being discharged from the nozzle 23. With this, during the high speed driving of the motor 55, it is possible to make a cooling control of the motor 55 according to the output sensitivity of the motor 55.

The entire contents of a prior Japanese Patent Application Laid-Open No. 2008-052614 (filed on Mar. 3, 2008 in Japan) is incorporated herein by reference, in order to take some protection against translation errors or omitted portions.

As set forth above, although the present invention has been described above according to the embodiments, the present invention is not limited to the above descriptions, and various modifications or improvements thereof will occur to those skilled in the art.

[Industrial Applicability]

According to the present invention, an electric motor comprises: a stator; a rotor axially supported to a rotational shaft in such a configuration as to rotate relative to the stator, the rotor being adapted to be cooled by a cooling medium; a cooling medium storing portion disposed on the stator side and storing therein the cooling medium; and a cooling medium channel for leading the cooling medium from the cooling medium storing portion to the rotor. A discharge port for discharging the cooling medium of the cooling medium channel is disposed close to a rotational portion of the rotor, the cooling medium storing portion is disposed lower than the discharge port. and the cooling medium is led from the cooling medium storing portion via the cooling medium channel to the rotor and then is discharged from the discharge port. With this, the cooling medium can cool the rotor without the need of providing an external pump, and the rotor's cooling efficiency can be prevented from being deteriorated. which deterioration may be caused when the viscosity resistance of the cooling medium is increased during the low speed rotation of the rotor.

The invention claimed is:

1. An electric motor, comprising:
a stator;
a rotor axially supported to a rotational shaft in such a configuration as to rotate relative to the stator, the rotor being adapted to be cooled by a cooling medium;
a cooling medium storing portion disposed on the stator side and storing therein the cooling medium; and
a cooling medium channel for leading the cooling medium from the cooling medium storing portion to the rotor, wherein
a discharge port for discharging the cooling medium of the cooling medium channel is disposed close to a rotational portion of the rotor,
the cooling medium storing portion is disposed lower than the discharge port, and
a negative pressure caused between the rotor and the discharge port sucks the cooling medium in the cooling medium storing portion.

2. The electric motor according to claim 1, wherein
the cooling medium storing portion is disposed at a base portion in a case which is lower than the rotational shaft of the electric motor, the rotational shaft being positioned in a lateral direction, and a surface of the cooling medium stored in the cooling medium storing portion is disposed lower than an air gap between the rotor and the stator.

3. The electric motor according to claim 1, wherein the discharge port is formed into a protrusion opposed to the rotational portion of the rotor.

4. The electric motor according to claim 1, wherein a flow channel forming portion having openings on both sides in a circumferential direction of the rotor and extending along the circumferential direction of the rotor is disposed at the discharge port.

5. The electric motor according to claim 4, wherein, in the flow channel forming portion, a center portion in a rotational direction of the rotor is narrower than at least one of both end portions in the rotational direction of the rotor.

6. The electric motor according to claim 1, wherein
the rotor includes a plurality of through holes disposed along a circumferential direction of the rotor and passing through a surface of the rotor and a backface of the rotor, and
the cooling medium passes through the through holes.

7. The electric motor according to claim 6, wherein, on a face on the discharge port side of the rotor, the rotor has a receiving portion which serves as a receiving port for receiving the cooling medium discharged from the discharge port and which transmits the thus received cooling medium to a through hole of the through holes.

8. The electric motor according to claim 7, wherein the flow channel forming portion is disposed higher than the receiving portion.

9. The electric motor according to claim 1, further comprising:
a pressure adjusting valve for adjusting an internal pressure of the cooling medium channel.

10. The electric motor according to claim 9, wherein
the pressure adjusting valve has a function to sense a temperature of the stator, and
according to the thus sensed temperature of the stator, the pressure adjusting valve adjusts the internal pressure of the cooling medium channel to equal to an internal pressure of the electric motor or into a negative pressure state caused during a rotation of the rotor.

11. The electric motor according to claim 1, wherein
the rotor has a downward slanting face extending along a direction of the rotational shaft, and
absorbing a heat of the rotor by the cooling medium while moving the cooling medium, the slanting face allows the cooling medium to go off from the rotor by means of a centrifugal force caused in a rotation of the rotor.

12. The electric motor according to claim 1, wherein
the cooling medium goes off from an end portion of the rotor, and
the rotor has a plate which blocks the air gap between the rotor and the stator to thereby prevent the thus going-off cooling medium from entering the air gap.

13. An axial gap electric motor, comprising:
a stator;
a rotor axially supported to a rotational shaft in such a configuration as to rotate relative to the stator, the rotor being adapted to be cooled by a cooling medium;
a cooling medium storing portion disposed on the stator side and storing therein the cooling medium;
a cooling medium channel for leading the cooling medium from the cooling medium storing portion to the rotor; and
a variable air gap mechanism for varying an air gap between the rotor and the stator by moving the rotor in such a configuration that the rotor approaches the stator and moves away from the stator,
wherein
a discharge port for discharging the cooling medium of the cooling medium channel is disposed close to a rotational portion of the rotor in such a configuration as to face a face opposite to the air gap between the rotor and the stator,
the cooling medium storing portion is disposed lower than the discharge port, and
a negative pressure caused between the rotor and the discharge port sucks the cooling medium in the cooling medium storing portion.

* * * * *